US010288736B2

(12) United States Patent
Lipson

(10) Patent No.: US 10,288,736 B2
(45) Date of Patent: May 14, 2019

(54) MULTI-WAVELENGTH ARRAY LIDAR

(71) Applicant: GM Global Technology Operations LLC, Detroit, MI (US)

(72) Inventor: Ariel Lipson, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 741 days.

(21) Appl. No.: 15/145,942

(22) Filed: May 4, 2016

(65) Prior Publication Data

US 2017/0350982 A1  Dec. 7, 2017

Related U.S. Application Data

(60) Provisional application No. 62/158,290, filed on May 7, 2015.

(51) Int. Cl.
| G01C 3/08 | (2006.01) |
| G01S 7/48 | (2006.01) |
| G02B 5/20 | (2006.01) |
| G01S 17/10 | (2006.01) |
| G01S 17/88 | (2006.01) |
| G01S 7/481 | (2006.01) |
| G01S 7/487 | (2006.01) |

(52) U.S. Cl.
CPC ............... *G01S 17/88* (2013.01); *G01C 3/08* (2013.01); *G01S 7/4802* (2013.01); *G01S 7/4815* (2013.01); *G01S 7/4816* (2013.01); *G01S 7/4817* (2013.01); *G01S 7/4876* (2013.01); *G01S 17/10* (2013.01); *G02B 5/20* (2013.01)

(58) Field of Classification Search
CPC .......... G01S 7/484; G01S 7/486; G01S 7/487; G01S 17/89; H01S 3/063; H04N 5/2254; H04N 5/2257; H04N 9/097
See application file for complete search history.

(56) References Cited

U.S. PATENT DOCUMENTS

| 6,215,924 B1 * | 4/2001 | Hulse | G02B 6/2937 |
| | | | 385/34 |
| 7,773,204 B1 * | 8/2010 | Nelson | G01S 13/48 |
| | | | 356/5.02 |
| 8,743,923 B2 * | 6/2014 | Geske | H01S 5/187 |
| | | | 372/108 |
| 2003/0099009 A1 * | 5/2003 | Noda | G02B 5/28 |
| | | | 359/15 |
| 2009/0052050 A1 * | 2/2009 | Kweon | G02B 13/08 |
| | | | 359/668 |

(Continued)

*Primary Examiner* — Isam A Alsomiri
*Assistant Examiner* — Amanda J Webster
(74) *Attorney, Agent, or Firm* — Cantor Colburn LLP

(57) ABSTRACT

A multi-wavelength array lidar system and a method of designing an array lidar system include arranging a plurality of lasers in an array to transmit a respective plurality of beams, arranging a lens to disperse the plurality of beams at a respective plurality of angles, and arranging a band pass filter to filter a plurality of reflections received at a respective plurality of incident angles resulting from the plurality of beams transmitted by the plurality of lasers at a respective plurality of transmit angles. Selecting a transmit wavelength of each of the plurality of beams is based on the respective plurality of transmit angles to ensure that a receive wavelength of each of the plurality of reflections is within a narrower range than a range of the transmit wavelengths.

13 Claims, 4 Drawing Sheets

(56) References Cited

U.S. PATENT DOCUMENTS

| | | | | |
|---|---|---|---|---|
| 2013/0201560 A1* | 8/2013 | Dueck | ............... | H01S 3/0071 |
| | | | | 359/569 |
| 2014/0034840 A1* | 2/2014 | Davenport | ............ | G01J 3/42 |
| | | | | 250/370.01 |
| 2014/0109444 A1* | 4/2014 | Dumont | ........... | A43B 13/145 |
| | | | | 36/25 R |

* cited by examiner

MULTI-WAVELENGTH ARRAY LIDAR

CROSS-REFERENCE TO RELATED APPLICATION

This application is a Non-Provisional of U.S. Provisional Application No. 62/158,290 filed May 7, 2015, the disclosure of which is incorporated herein by reference in its entirety.

FIELD OF THE INVENTION

The subject invention relates to multi-wavelength array lidar.

BACKGROUND

Lidar, which may be referred to as light radar or laser array light detection and ranging, refers generally to transmitting light at an object and receiving and processing a resulting reflection. An array of lasers may be used in an array lidar system to obtain reflections from a wider field of view than is possible with a single laser. In a current array lidar system, all the lasers of the array transmit light at the same wavelength. On the receiver side, a band pass filter is generally used to filter the received reflections and keep out as much sunlight and other interfering light as possible to increase signal-to-noise ratio (SNR). The angle of incidence of the reflections resulting from each of the lasers at the band pass filter is not the same. Because the band pass filter exhibits an angle-wavelength dependence, this means that the different received reflections (transmitted at the same wavelength at different angles and received at the different angles of incidence) are not passed by the band pass filter with the same wavelength. Instead, lower wavelengths are passed by the band pass filter for reflections received at higher angles of incidence. Accordingly, it is desirable to provide an array lidar system that facilitates receiving reflections at the same wavelength (or very narrow band of wavelengths) regardless of the angle of incidence.

SUMMARY OF THE INVENTION

According to an exemplary embodiment, a method of designing an array lidar system includes arranging a plurality of lasers in an array to transmit a respective plurality of beams; arranging a lens to disperse the plurality of beams at a respective plurality of angles; arranging a band pass filter to filter a plurality of reflections received at a respective plurality of incident angles resulting from the plurality of beams transmitted by the plurality of lasers at a respective plurality of transmit angles; and selecting a transmit wavelength of each of the plurality of beams based on the respective plurality of transmit angles to ensure that a receive wavelength of each of the plurality of reflections is within a narrower range than a range of the transmit wavelengths.

According to another exemplary embodiment, a multi-wavelength array lidar system includes a plurality of lasers arranged in an array, the plurality of lasers configured to transmit a respective plurality of beams at a respective plurality of transmit angles and respective transmit wavelengths; and a band pass filter configured to filter a plurality of reflections received at a plurality of incident angles resulting from the plurality of beams transmitted at the plurality of transmit angles, wherein the transmit wavelength of each of the plurality of lasers is selected based on the respective plurality of transmit angles to ensure that a receive wavelength of each of the plurality of reflections is within a narrower range than a range of the transmit wavelengths.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

As noted above, a band pass filter is generally used at an input to the receiver side of an array lidar system. The band pass filter is designed to pass wavelengths associated with the laser transmissions but prevents other wavelengths from passing. Because sunlight is at all wavelengths, the wider the pass band of the band pass filter, the more sunlight is passed. Thus, from the perspective of keeping out sunlight to increase signal-to-noise ratio of the received reflections, as narrow a pass band as possible of the band pass filter is desirable. On the other hand, the pass band of the band pass filter must be wide enough to encompass the wavelengths of all the reflections resulting from transmitted laser beams. In the case of a typical array lidar system, the lasers all transmit at approximately the same wavelength. However, because the band pass filter exhibits angle-wavelength dependence, all of the reflections at all the different incident angles are not passed at approximately the same wavelength by the band pass filter. Instead, even when all the transmitted signals are at the same wavelength, received reflections with angles of incidence other than 0 degrees (perpendicular) are passed with proportionally different wavelengths compared with received reflections that come in perpendicular to the band pass filter interface. Thus, from the perspective of receiving all reflections resulting from laser transmissions, as wide a pass band as needed of the band pass filter is desirable. Embodiments of the systems and methods detailed herein relate to adjusting the transmitted wavelengths as needed to enable the use of a narrow pass band for the band pass filter. The embodiments address the opposing interests of existing array lidar systems to decrease the pass band of the bandpass filter for purposes of sunlight filtering and to increase the pass band for purposes of receiving all the reflections.

Figure 1:
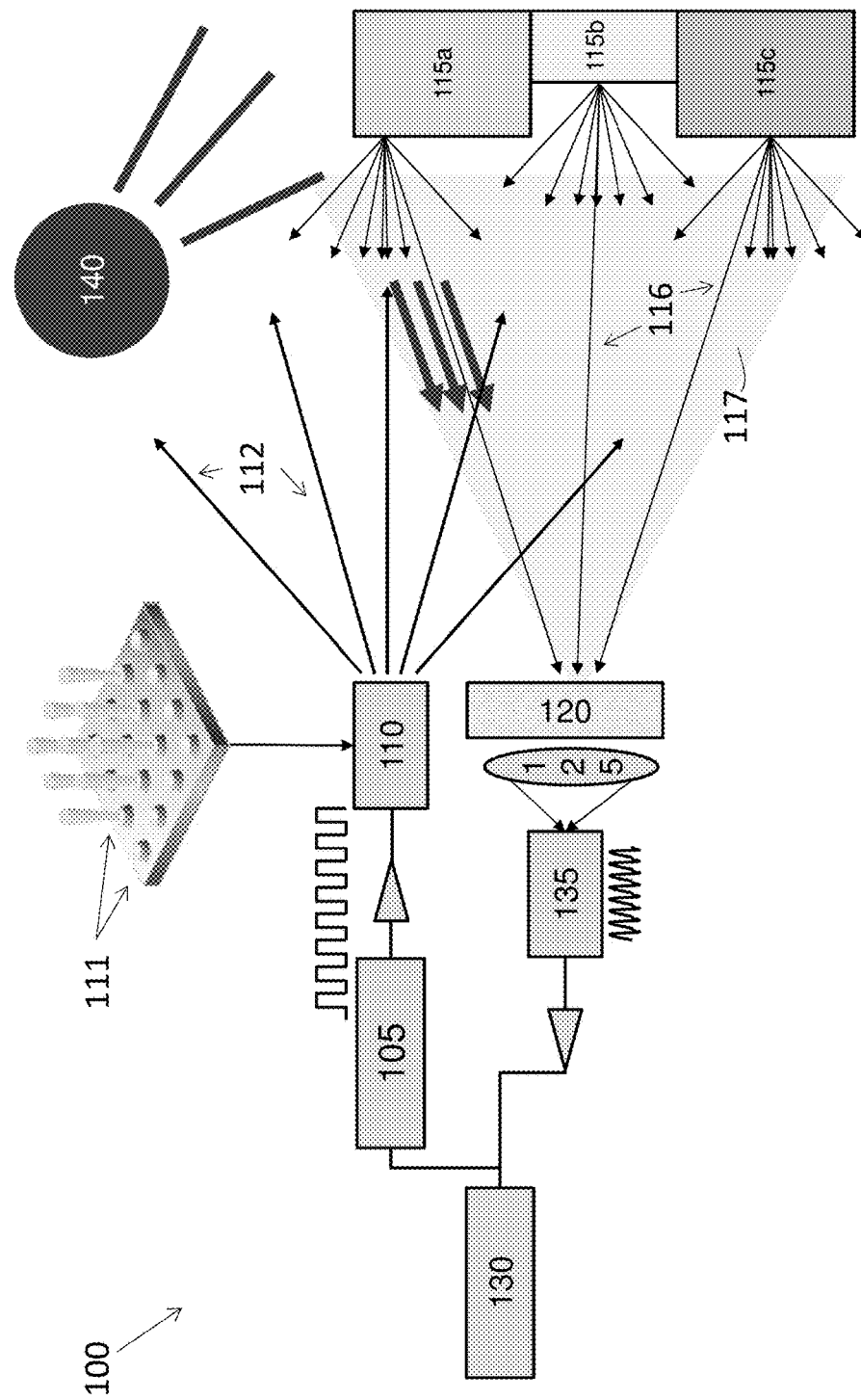
FIG. 1 is a block diagram of an array lidar system according to embodiments.

FIG. 1 is a block diagram of an array lidar system 100 according to embodiments. An array lidar 110 includes an array of lasers 111. Each laser 111 may be a vertical-cavity surface-emitting laser (VCSEL). A VCSEL is a semiconductor-based laser diode that emits an optical beam vertically from its top surface, as shown. The laser beam 112 emitted by each laser 111 (e.g., VCSEL) forms a field-ofview. Targets 115a-115c (generally 115) in the field of view of the array lidar 110 result in reflections 116 that are received at a bandpass filter (BPF) 120. The reflections 116 in the field of view 117 of the receive side of the array lidar system 100 are filtered by the BPF 120 and focused through a lens 125 to an avalanche photodiode (APD) 135 that converts the received and filtered light into an electrical signal. This electrical signal is provided to a processing system 130. The processing system 130 may generate the signal ultimately emitted as laser beams 112. The generated signal may pass through an amplitude modulator 105 before reaching the array lidar 110. As FIG. 1 indicates, light from the sun 140 may affect the reflections 116 from the targets 115.

As FIG. 1 indicates, the various reflections 116 have different angles of incidence with the BPF 120. Because of the angle-wavelength dependence of the BPF 120, laser beams 112 transmitted at nearly the same wavelength would exhibit different wavelengths at the BPF 120 based on their particular angle of incidence to the BPF 120. In order to capture all those reflections 116, the pass band of the BPF 120 would have to be sufficiently broad. However, a consequence of a wider pass band might be that wavelengths in the reflections 116 that are associated with sunlight may also be passed and may reduce SNR. According to the embodiments herein, the laser beams 112 are not all transmitted at nearly the same wavelength. Instead, the angles are taken into account during transmission in order to make the wavelengths of the reflections 116 at the different angles of incidence nearly the same or within a narrow band of frequencies. This facilitates a narrow pass band for the BPF 120 that results in less sunlight-associated wavelengths passing through the BPF 120. Because a narrow BPF 120 may be used, a single photon Avalance detector (SPAD), which is sensitive to sunlight, may be used as the avalanche photodiode 135. An avalanche detector includes an internal amplifier and is more sensitive than a pin diode, which is also used as an optical detector. The increased sensitivity can make the avalanche detector susceptible to saturation because of sunlight or other ambient light, as well. By employing the BPF 120 according to embodiments herein to address (filter out) the sunlight and other ambient light, a SPAD, which is even more sensitive than an avalanche detector, may be used as the avalanche photodiode 135. The wavelength that must be transmitted by the different lasers 111 of the array lidar in order to facilitate the narrow pass band of the BPF 120 may be determined quantitatively as detailed below. According to alternate embodiments, a freeform optical design may be adopted instead. That is, wavelengths may generally be selected based on transmitted angles according to the principle that laser beams 112 transmitted at higher angles (which result in higher angles of incidence of the reflections 116) should be transmitted at lower wavelengths that laser beams 112 transmitted at lower angles in order to have all the reflections 116 within a narrow wavelength range.

The wavelength of each transmitted laser beam 112 may be selected quantitatively based on:

$$\lambda_\phi = \lambda_0 \sqrt{\left(1 - \left(\frac{n_0}{n^*}\right)^2 \sin^2\phi\right)} \quad \text{[EQ. 1]}$$

In EQ. 1, $\phi$ is the angle of incidence, $\lambda_\phi$ is the wavelength at the angle of incidence, $\lambda_0$ is the wavelength at the BPF 120 if the angle of incidence $\phi$ of the reflection 116 were 0 degrees. The refractive index of the medium surrounding the BPF 120 is indicated as $n_0$, and the effective refractive index for the BPF 120 $n^*$ is fixed and is based on the thin film material of the BPF 120. That is, EQ. 1 indicates the wavelength ($\lambda_\phi$) that results at the BPF 120 based on the transmitted wavelength ($\lambda_0$) and the angle of incidence $\phi$. While the angle of incidence $\phi$ is fixed according to the location of each laser 111 within the array lidar 110, the transmitted wavelength ($\lambda_0$) may be adjusted to ensure that the value of the received wavelength ($\lambda_\phi$) at the BPF 120 is within a desired range. Accordingly, in order to use EQ. 1 to determine the wavelength of transmission ($\lambda_0$) at each laser 111, the angle of incidence $\phi$ associated with each laser 111 must be determined. This is discussed with reference to FIG. 2.

Figure 2:
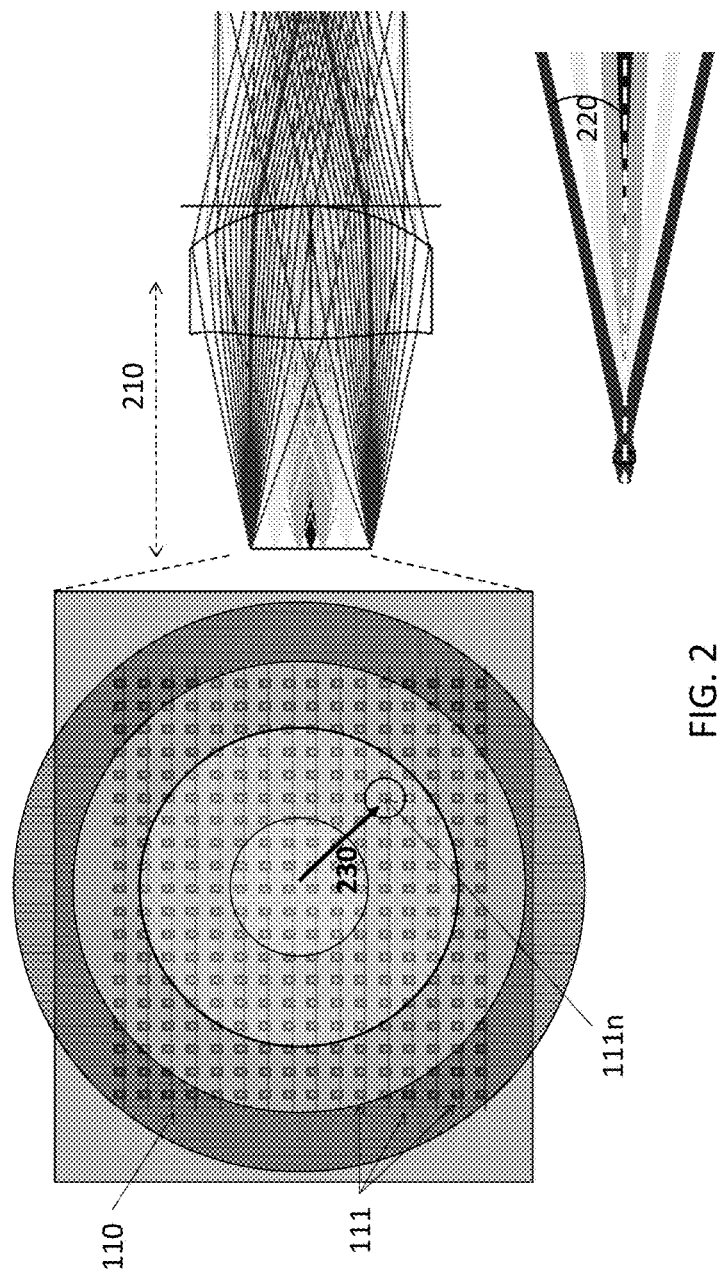
FIG. 2 shows the angle used to determine the wavelength for transmission according to embodiments.

FIG. 2 shows the angle used to determine the wavelength for transmission according to embodiments. The angle α 220 of a transmitted laser beam 112 (relative to a line perpendicular to a cross-section of the array lidar 110) is also the angle of incidence $\phi$ of the resulting reflection 116 and is given by:

$$\alpha = 2\arctan\frac{d}{2f} \quad \text{[EQ. 2]}$$

In EQ. 2, d is the distance 230 from a given laser 111n of the array lidar 110 to the center of the lidar array 110 (at which a transmission would be perpendicular to the cross-section of the lidar array 110). Also in EQ. 2, f is the focal length 210 of a lens of the lidar array 110 is generally indicated in FIG. 2.

Figure 3:
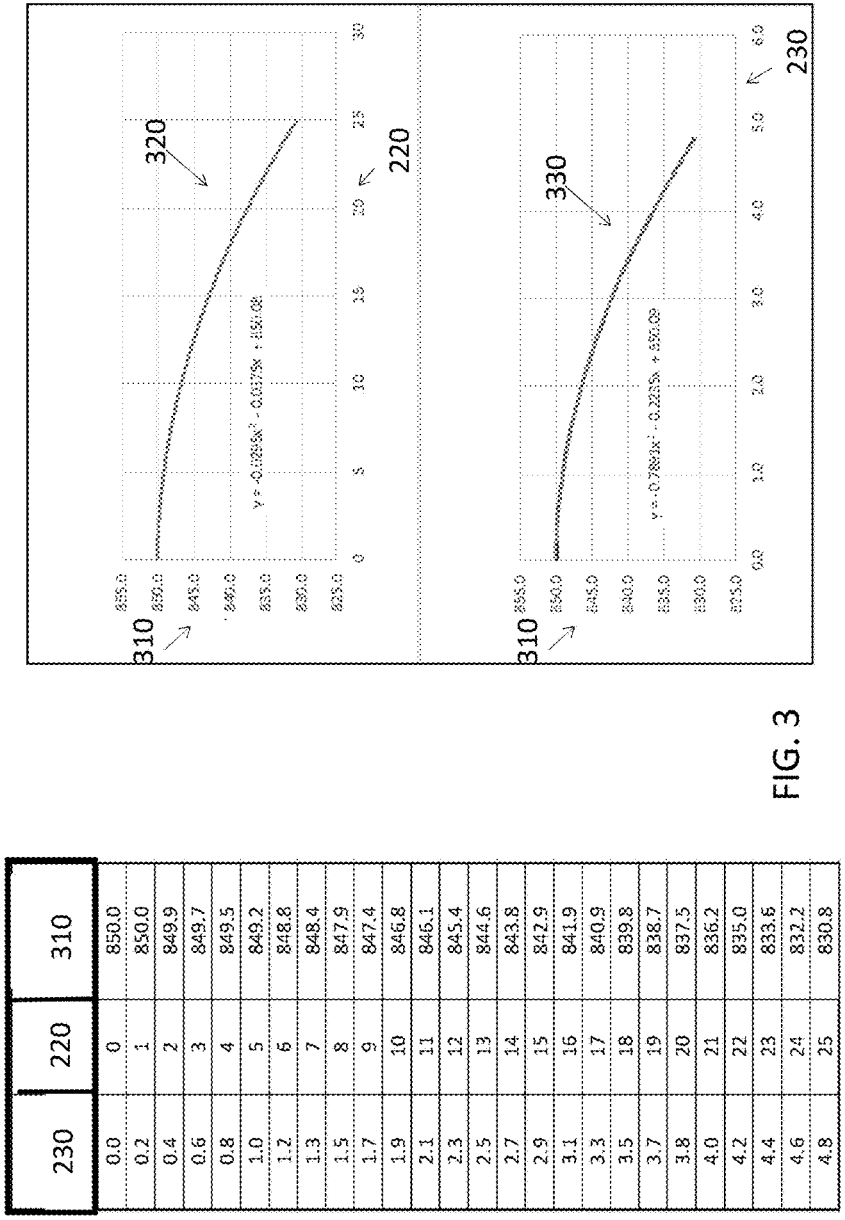
FIG. 3 shows exemplary transmitted wavelength values according to embodiments.

FIG. 3 shows exemplary transmitted wavelength 310 values according to embodiments. Graph 320 illustrates the relationship between angle α 220 in degrees (shown on the x axis) and transmitted wavelength 310 in nanometers (nm) (shown on the y axis) that is required to keep the wavelength of the reflection 116 at the BPF 120 a constant 850 nm. With a focal length 210 of 25 mm, the graph 320 is given by the equation:

$$y=-0.0295x^2-0.375x+850.08 \quad \text{[EQ. 3]}$$

Graph 330 illustrates the relationship between distance 230 in millimeters (mm) (shown on the x axis) and transmitted wavelength 310 (shown on the y axis) to keep the wavelength of the reflection 116 at the BPF 120 a constant 850 nm. The graph 330 is given by the equation:

$$y=-0.7891x^2-0.2235x+850.09 \quad \text{[EQ. 4]}$$

As graphs 320 and 330 indicate, the transmitted wavelength 310 must be decreased (from the central wavelength of 850 nm) as the distance 230 (and, thus, the angle α 220) increases, in order to facilitate a narrow pass band at the BPF 120. The values in FIG. 3 are based on a focal length 210 of 25 mm.

Figure 4:
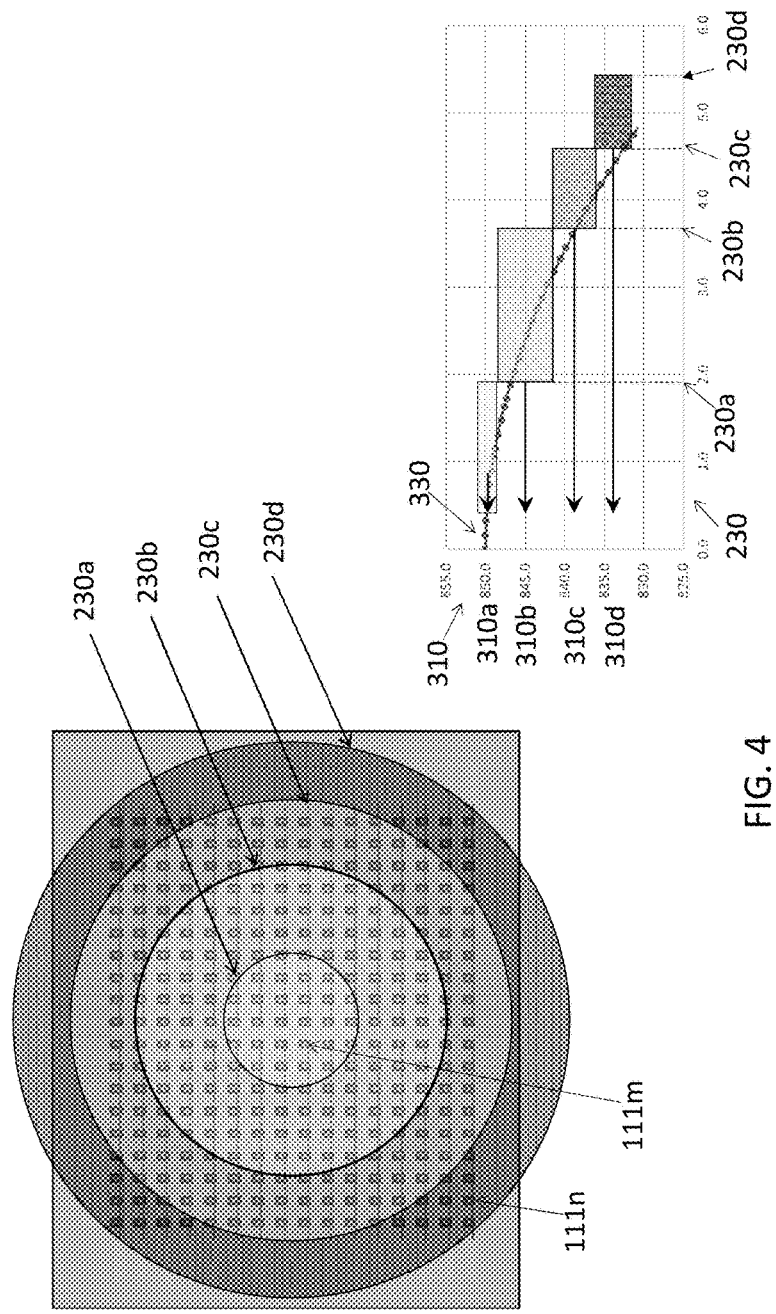
FIG. 4 shows the array lidar and corresponding transmission wavelength ranges according to distance ranges according to embodiments.

FIG. 4 shows the array lidar 110 and corresponding transmission wavelength 310 ranges according to distance 230 ranges 410a through 410d according to embodiments. That is, four radial distances 230 from the center of the array lidar 110 are indicated as 230a, 230b, 230c, and 230d. The graph 330 showing distance 230 and corresponding transmitted wavelength 310 is shown again with the distances 230a through 230d indicated by the corresponding color blocks. Transmitted wavelengths 310a through 310d corresponding with each of the distances 230a through 230d are also indicated. That is, the transmitted wavelength 310 for lasers 111 within a given radial distance 230a is wavelength 310a. The transmitted wavelength 310 for lasers 111 between a radial distance 230a and distance 230b is wavelength 310b. The transmitted wavelength 310 for lasers 111 between radial distances 230b and 230c is wavelength 310c. The transmitted wavelength 310 for lasers 111 between radial distances 230c and 230d is wavelength 310d. Thus, laser 111m would transmit at wavelength 310a, and laser 111n would transmit at wavelength 130d. As noted with reference to FIG. 3, the transmitted wavelength 310 decreases as the distance 230 increases. While the example above considers four distances 230a through 230d from the center of the array lidar 110, a more coarse or fine granularity may be used for determining the transmitted wavelengths 310. The granularity by which distance ranges are selected may be based on the desired narrowness for the pass band of the BPF 120.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of designing an array lidar system, the method comprising:
   arranging a plurality of lasers in an array to transmit a respective plurality of transmit beams at a respective plurality of transmit wavelengths, wherein the plurality of transmit wavelengths are within a transmit wavelength range;
   arranging a lens to disperse the plurality of transmit beams from the respective plurality of lasers at a respective plurality of transmit angles;
   arranging a band pass filter to filter a plurality of reflections received, based on reflection of the plurality of transmit beams transmitted from the plurality of lasers by one or more objects, at a respective plurality of incident angles, wherein the plurality of incident angles of the plurality of reflections result from the plurality of transmit angles of the plurality of transmit beams and the band pass filter outputs a plurality of receive wavelengths within a receive wavelength range; and
   selecting the transmit wavelength of each of the plurality of transmit beams based on an angle-wavelength dependence of the band pass filter and on the respective plurality of incident angles at the band pass filter, resulting from the plurality of transmit angles, to ensure that the receive wavelength range obtained by the band pass filter from the plurality of reflections is a smaller range of values than the transmit wavelength range of the plurality of transmit beams.

2. The method according to claim 1, wherein the selecting the transmit wavelength includes selecting a lower value for the transmit wavelength of one of the plurality of lasers that is farther from a center of the array than for another of the plurality of lasers that is closer to the center of the array.

3. The method according to claim 2, wherein the selecting the transmit wavelength includes grouping the plurality of lasers according to radial distance from the center of the array and selecting a same transmit wavelength for the lasers of the plurality of lasers that are in a predefined range of radial distances from the center of the array.

4. The method according to claim 1, further comprising determining each of the respective plurality of transmit angles as:

$$\alpha = 2\arctan\frac{d}{2f},$$

wherein
   $\alpha$ is the transmit angle, d is a distance from a center of the array to the respective laser among the plurality of lasers, and f is a focal length of the lens.

5. The method according to claim 4, wherein the selecting the transmit wavelength of each of the plurality of transmit beams includes selecting a lower value for the transmit wavelength for one of the plurality of lasers than for another one of the plurality of lasers based on the one of the plurality of lasers having a higher value of the transmit angle than the another one of the plurality of lasers.

6. The method according to claim 1, wherein the selecting the transmit wavelength is based on the receive wavelength for each of the plurality of reflections being given by:

$$\lambda_\phi = \lambda_0 \left(1 - \left(\frac{n_0}{n^*}\right)^2 \sin^2\phi\right)^{1/2},$$

wherein
   for each reflection among the plurality of reflections, $\lambda_0$ is the receive wavelength associated with a 0 degree incident angle among the plurality of incident angles, no is the refractive index of a medium surrounding the band pass filter, n* is an effective refractive index of the band pass filter, and $\phi$ is the incident angle among the plurality of incident angles that is associated with the reflection among the plurality of reflections.

7. The method according to claim 6, wherein the selecting the transmit wavelength includes finding a value for $\lambda_0$ to obtain a desired $\lambda_\phi$.

8. A multi-wavelength array lidar system, comprising:
   a plurality of lasers arranged in an array, the plurality of lasers configured to transmit a respective plurality of transmit beams with a respective plurality of transmit wavelengths at a respective plurality of transmit angles, wherein the plurality of transmit wavelengths are within a transmit wavelength range; and
   a band pass filter configured to filter a plurality of reflections received, based on reflection of the plurality of transmit beams transmitted from the plurality of lasers by one or more objects, at a respective plurality of incident angles resulting from the plurality of beams transmitted at the plurality of transmit angles, wherein the plurality of incident angles of the plurality of reflections result from the plurality of transmit angles of the plurality of transmit beams and the band pass filter outputs a plurality of receive wavelengths within a receive wavelength range, and the transmit wavelength of each of the plurality of lasers is selected based on the respective plurality of transmit angles to ensure that the receive wavelength range obtained by the band pass filter from the plurality of reflections is a smaller range of values than the transmit wavelength range of the plurality of transmit beams.

9. The system according to claim 8, wherein the transmit wavelength of one of the plurality of lasers is a lower value than the transmit wavelength of another one of the plurality of lasers based on the one of the plurality of lasers being farther from a center of the array than the another one of the plurality of lasers.

10. The system according to claim 9, wherein the transmit wavelength of the lasers among the plurality of lasers that are within a range of radial distances to the center of the array are a same wavelength value.

11. The system according to claim 8, wherein each of the respective plurality of transmit angles is given by:

$$\alpha = 2\arctan\frac{d}{2f},$$

wherein
α is the transmit angle, d is a distance from a center of the array to the respective laser among the plurality of lasers, and f is a focal length of a lens of the array.

12. The system according to claim 11, wherein the transmit wavelength of one of the plurality of lasers is a lower value than the transmit wavelength of another one of the plurality of lasers based on the one of the plurality of lasers having a larger value for the transmit angle than the another one of the plurality of lasers.

13. The system according to claim 8, wherein the receive wavelength for each of the plurality of reflections is given by:

$$\lambda_\phi = \lambda_0\left(1 - \left(\frac{n_0}{n^*}\right)^2 \sin^2\phi\right)^{1/2},$$

wherein
for each reflection among the plurality of reflections, $\lambda_0$ is the receive wavelength associated with a 0 degree incident angle among the plurality of incident angles, $n_0$ is the refractive index of a medium surrounding the band pass filter, $n^*$ is an effective refractive index of the band pass filter, and $\phi$ is the incident angle among the plurality of incident angles that is associated with the reflection among the plurality of reflections.

* * * * *